(12) United States Patent
Fitzgerald (10) Patent No.: US 11,565,820 B2
(45) Date of Patent: Jan. 31, 2023

(54) QUICK RELEASE SYSTEM

(71) Applicant: Capewell Aerial Systems LLC, South Windsor, CT (US)

(72) Inventor: Adam J. Fitzgerald, Enfield, CT (US)

(73) Assignee: Capewell Aerial Systems LLC, South Windsor, CT (US)

( * ) Notice: Subject to any disclaimer, the term of this patent is extended or adjusted under 35 U.S.C. 154(b) by 675 days.

(21) Appl. No.: 16/573,108

(22) Filed: Sep. 17, 2019

(65) Prior Publication Data

US 2021/0078712 A1    Mar. 18, 2021

(51) Int. Cl.
B64D 17/38    (2006.01)

(52) U.S. Cl.
CPC .................................. B64D 17/38 (2013.01)

(58) Field of Classification Search
CPC ........ B64D 17/38; F16B 45/04; F16B 45/043; F16B 45/049; F16B 45/051; F16B 45/053; F16B 45/057
See application file for complete search history.

(56) References Cited

U.S. PATENT DOCUMENTS

| | | | | |
|---|---|---|---|---|
| 701,586 A * | 6/1902 | Levitt | ...................... | F16B 45/04 24/600.7 |
| 1,669,418 A * | 5/1928 | Lemexjohn | ............. | E21B 19/04 294/82.2 |
| 2,328,914 A * | 9/1943 | Kubatjosephe | ........ | B64D 17/38 403/DIG. 4 |
| 2,410,816 A * | 11/1946 | Frieder | ..................... | B66C 1/38 294/82.25 |
| 2,667,376 A * | 1/1954 | Schlachterfredw | .. | B64D 17/383 294/82.25 |
| 3,365,759 A * | 1/1968 | Molzan | .................. | B64D 17/38 24/598.9 |
| 3,918,758 A * | 11/1975 | Fournier | ................... | B66C 1/36 24/599.7 |
| 4,655,447 A * | 4/1987 | Dubrinsky | ......... | A63B 21/4007 482/54 |
| 4,684,083 A * | 8/1987 | Maziarz | ................ | B64D 17/38 24/DIG. 36 |
| 5,156,430 A * | 10/1992 | Mori | ......................... | B66C 1/36 294/82.23 |
| 6,168,344 B1 * | 1/2001 | Aguirre, Jr. | ........... | A01K 27/005 403/DIG. 4 |
| 6,401,312 B1 * | 6/2002 | Wang | ...................... | F16B 45/04 24/598.7 |
| 7,472,461 B2 * | 1/2009 | Anstee | ................... | A63B 29/02 24/600.8 |

(Continued)

*Primary Examiner* — Justin M Benedik
(74) *Attorney, Agent, or Firm* — Alix, Yale & Ristas, LLP (57) ABSTRACT

Disclosed herein is a quick release assembly. The quick release assembly includes a main body, a cover member, a pin, and a lever. The main body has a first end, a second end, and an opening between the first and second ends. The first end includes a first receiving portion. The second end includes a second receiving portion. The cover member is between the first and second ends. The pin is disposed between the main body and the cover member. The pin includes a slot. The lever is mounted at the opening of the main body. A first end of the lever is at the slot, and a second end of the lever extends from a side of the main body. The pin is configured to move between the first and second ends in response to pivoting of the lever.

20 Claims, 10 Drawing Sheets

(56) References Cited

U.S. PATENT DOCUMENTS

| | | | |
|---|---|---|---|
| 10,434,343 B1* | 10/2019 | Guthrie | B66C 1/36 |
| 10,512,799 B2* | 12/2019 | Fitzgerald | B64D 17/32 |
| 10,605,298 B2* | 3/2020 | Zavala Riva Palacio | A44B 13/02 |
| 11,208,299 B2* | 12/2021 | Betzler | B66C 1/14 |
| 2002/0162201 A1* | 11/2002 | Liu | F16B 45/021 24/598.5 |
| 2005/0278908 A1* | 12/2005 | Johnson | A01K 27/005 24/600.7 |
| 2017/0130762 A1* | 5/2017 | Zavala Riva Palacio | F16B 45/04 |
| 2018/0126196 A1* | 5/2018 | Fitzgerald | A62B 35/0037 |

* cited by examiner

QUICK RELEASE SYSTEM

BACKGROUND

This disclosure is directed to a system for connecting and disconnecting cargo straps. More particularly, this disclosure is directed to an aerial delivery lashing system with the capability of quick disconnection.

Figure 1:
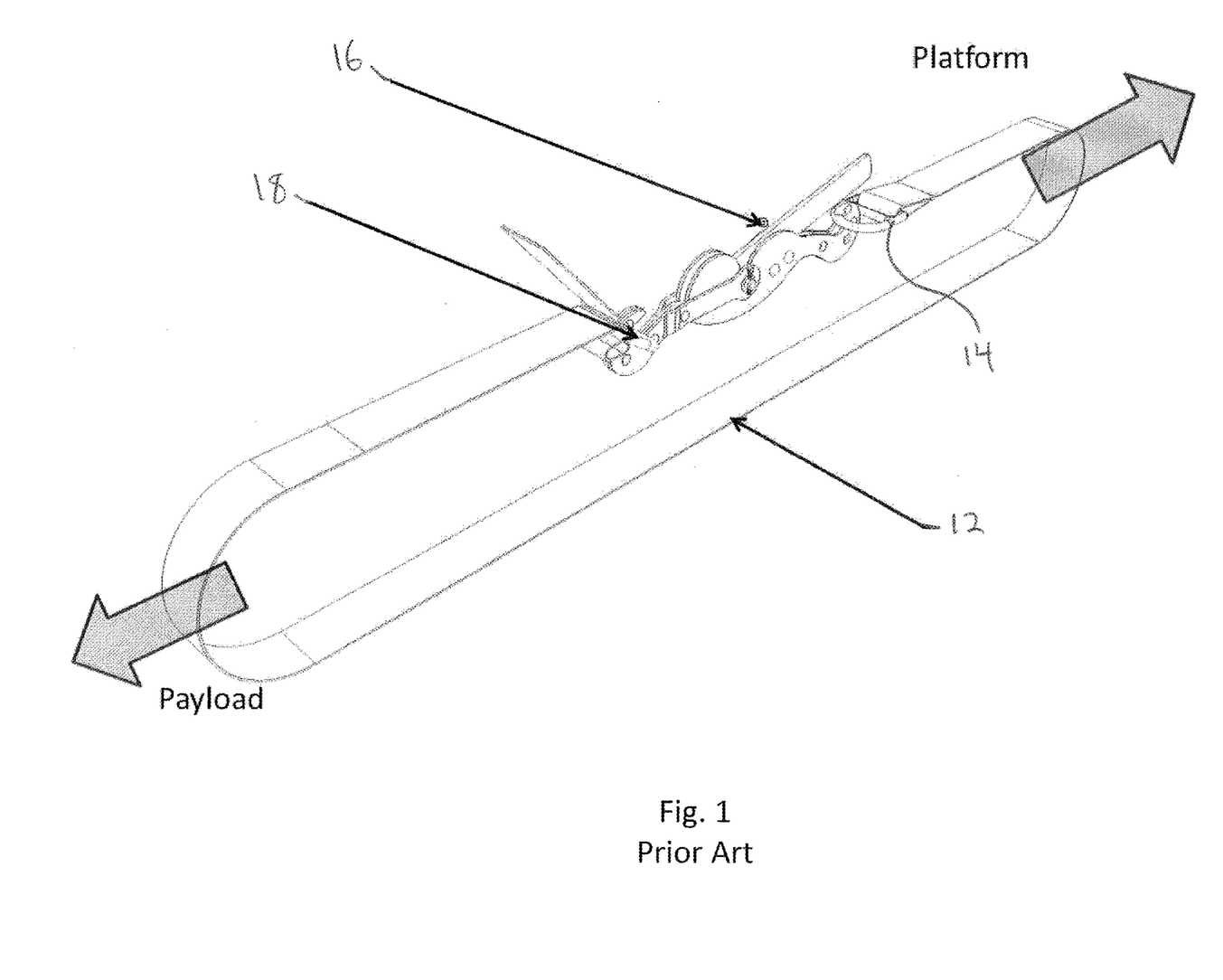
FIG. 1 is a perspective view of a conventional lashing system.

A variety of equipment is dropped from aircraft by parachute. In many instances this is done by a platform that supports the equipment and is attached to a parachute system. Parachutes are used both to extract the platform from the aircraft and to support the platform during its descent. Existing lashings are used to rig (and restrain) a payload to the platform, typically by connecting a hard point on a vehicle to a tie down ring on the platform. FIG. 1 illustrates an existing 10,000 lb. lashing 10 which generally includes a strap 12 and a D-shaped ring 14. The lashing 10 uses a load binder 16 and a parachute harness ring 18 to tension the lashing 10. Upon landing, the load binder 16 must be de-tensioned and the lashing strap 12 removed from the payload before the payload can be moved. In conventional configurations, there is no ready means of de-tensioning and then disconnecting the load binder, because residual tension (in the webbing) frequently prevents the load binder from being opened.

Since time is of the essence in some aerial delivery landing situations, there is a need to provide a lashing system having quick disconnecting members to improve derigging time.

SUMMARY

In accordance with one aspect of the present disclosure, a quick release assembly is disclosed. The quick release assembly includes a main body, a cover member, a pin, and a lever. The main body has a first end, a second end, and an opening between the first and second ends. The first end includes a first receiving portion. The second end includes a second receiving portion. The cover member is between the first and second ends. The pin is disposed between the main body and the cover member. The pin includes a slot. The lever is mounted at the opening of the main body. A first end of the lever is at the slot, and a second end of the lever extends from a side of the main body. The pin is configured to move between the first and second ends in response to pivoting of the lever.

In accordance with another aspect of the present disclosure, a quick release system is disclosed. The quick release system includes a strap adjusting member; a strap assembly, a quick release assembly, and a connecting member. The strap assembly includes a strap and a ring. The strap is connected to the strap adjusting member. The quick release assembly is removably connected to the strap. The quick release assembly has a main body, a cover member, a pin, and a lever. The main body has a first end, a second end, and an opening between the first end and the second end. The first end includes a first receiving portion. The second end includes a second receiving portion. The cover member is between the first end and the second end. The pin is movably disposed between the main body and the cover member. The pin includes a slot. The lever is pivotably mounted at the opening of the main body. A first end of the lever is at the slot of the pin, and a second end of the lever extends from a side of the main body. The connecting member is between the quick release assembly and the ratchet tensioner. The second receiving portion is configured to receive the ring. An end of the pin is configured to move within the second receiving portion of the main body in response to movement of the lever.

BRIEF DESCRIPTION OF THE DRAWINGS

The foregoing aspects and other features of the invention are explained in the following description, taken in connection with the accompanying drawings, wherein.

DETAILED DESCRIPTION

Figure 2:
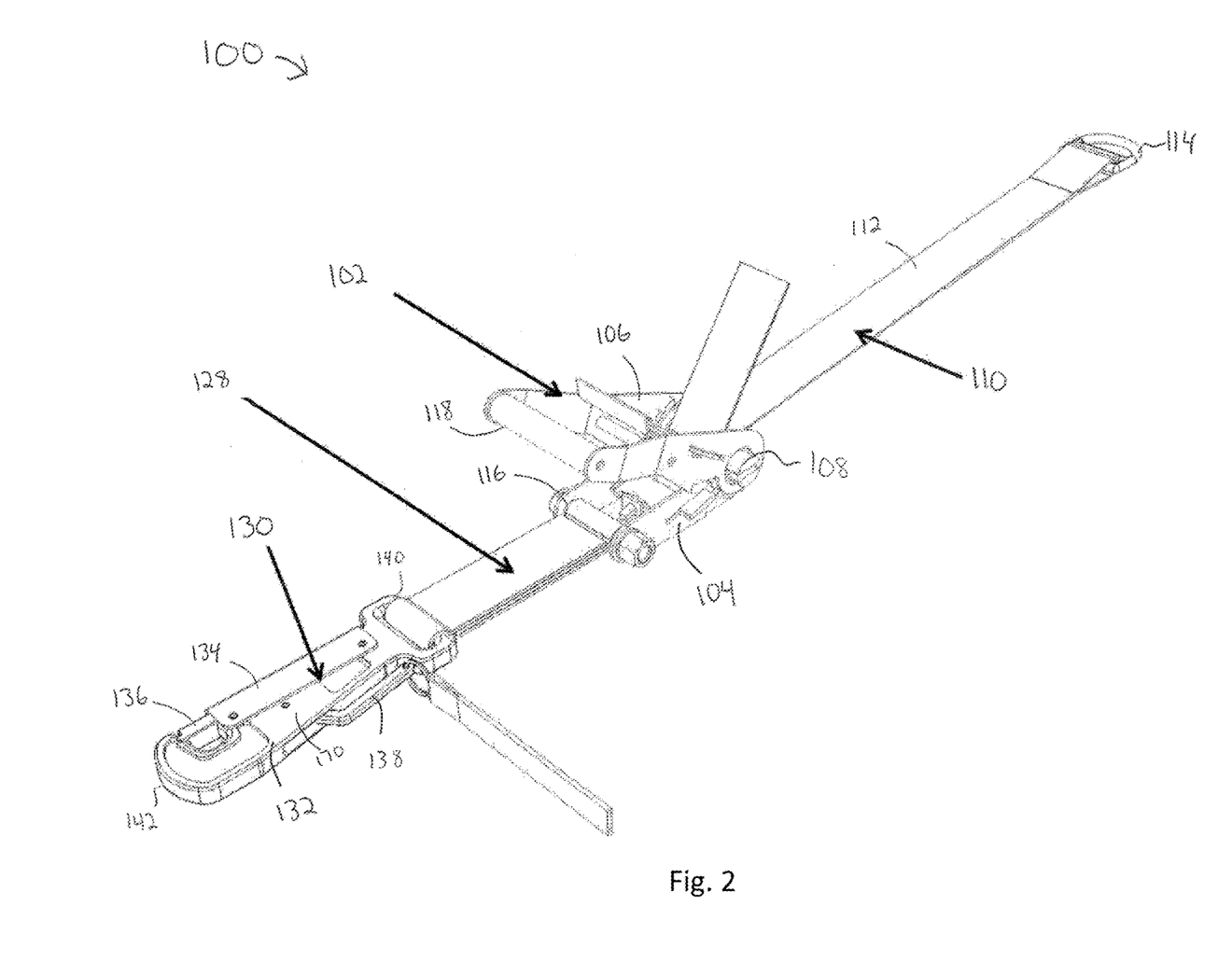
FIG. 2 is a perspective view of a quick release system incorporating features of the present disclosure.

Referring to FIG. 2, there is shown a perspective view of a quick release system 100 incorporating features of the present disclosure. Although the present disclosure will be described with reference to the exemplary embodiments shown in the drawings (wherein like numerals represent like parts throughout the figures), it should be understood that the present disclosure can be embodied in many alternate forms of embodiments. In addition, any suitable size, shape or type of elements or materials could be used.

The quick release system 100 includes a strap adjusting member 102, a strap assembly 110 extending through a portion of the strap adjusting member 102, a quick release assembly 130 configured to be removably connected to the strap assembly 110, and a connecting member 128 between the strap adjusting member 102 and the quick release assembly 130.

The strap adjusting member 102 is configured to provide tension to the strap assembly 110. In this embodiment, the strap adjusting member 102 is a ratchet tensioner, such as a short wide handle ratchet manufactured by US Cargo Control, for example. However in alternate embodiments, the strap adjusting member may be any suitable type of hardware member configured to provide tension to the strap assembly 110. The ratchet tensioner 102 generally comprises a first handle 104, a second handle 106, and a rotating spool 108. The first handle 104 comprises a first bar 116 at an end of the first handle opposite the spool 108. The second handle 106 comprises a second bar 118 at an end of the second handle opposite the spool 108.

The strap (or lashing) assembly 110 includes a strap 112 and a ring 114 (such as a D-shaped ring, for example). The ring 114 is configured to be removably connected to the quick release assembly 130. The end of the strap assembly 110 opposite the ring 114 is configured to be received by a slot in the spool 108 of the strap adjusting member 102.

Figure 3:
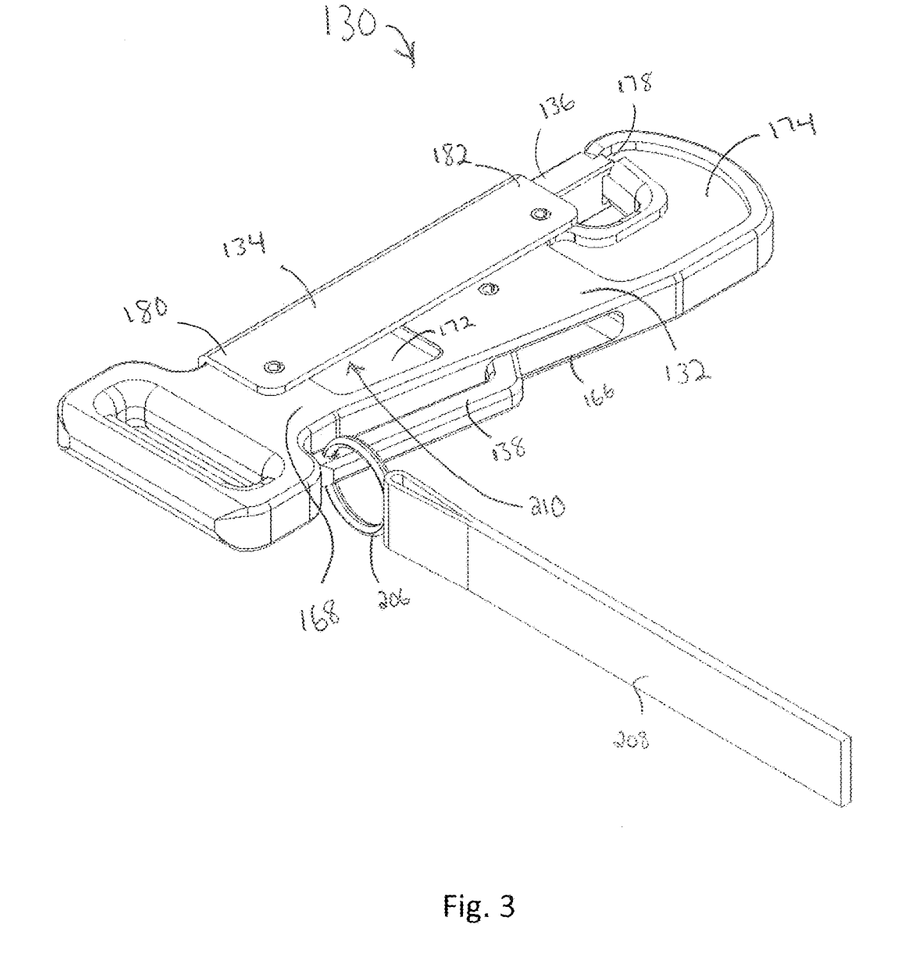
FIG. 3 is a perspective view of a quick release assembly used in the quick release system shown in FIG. 2.

Referring now also to FIG. 3, the quick release assembly 130 comprises a main body 132, a cover member 134, a pin assembly 136, and a lever 138. The quick release assembly 130 is secured to the strap adjusting member 102 by the connecting member 128 (which is connected to the second bar 116 of the strap adjusting member 102). In this embodiment, the connecting member 128 is a tie down polyester webbing (such as a webbing meeting Commercial Item Description [CID] A-A-55242 type V, for example), however in alternate embodiments other suitable types of connecting members capable of meeting the desired breaking strength requirement may be provided.

Referring now also to FIG. 4-8, the main body 132 comprises a one-piece member having a first end 140 and a second end 142. The first end 140 includes a connecting member receiving portion 144, and the second end 142 includes a ring receiving portion 146. The main body 132 further comprises a contact surface 148 extending between the first end 140 and the second end 142, and a lateral side 150 opposite the contact surface 148.

Figure 4:
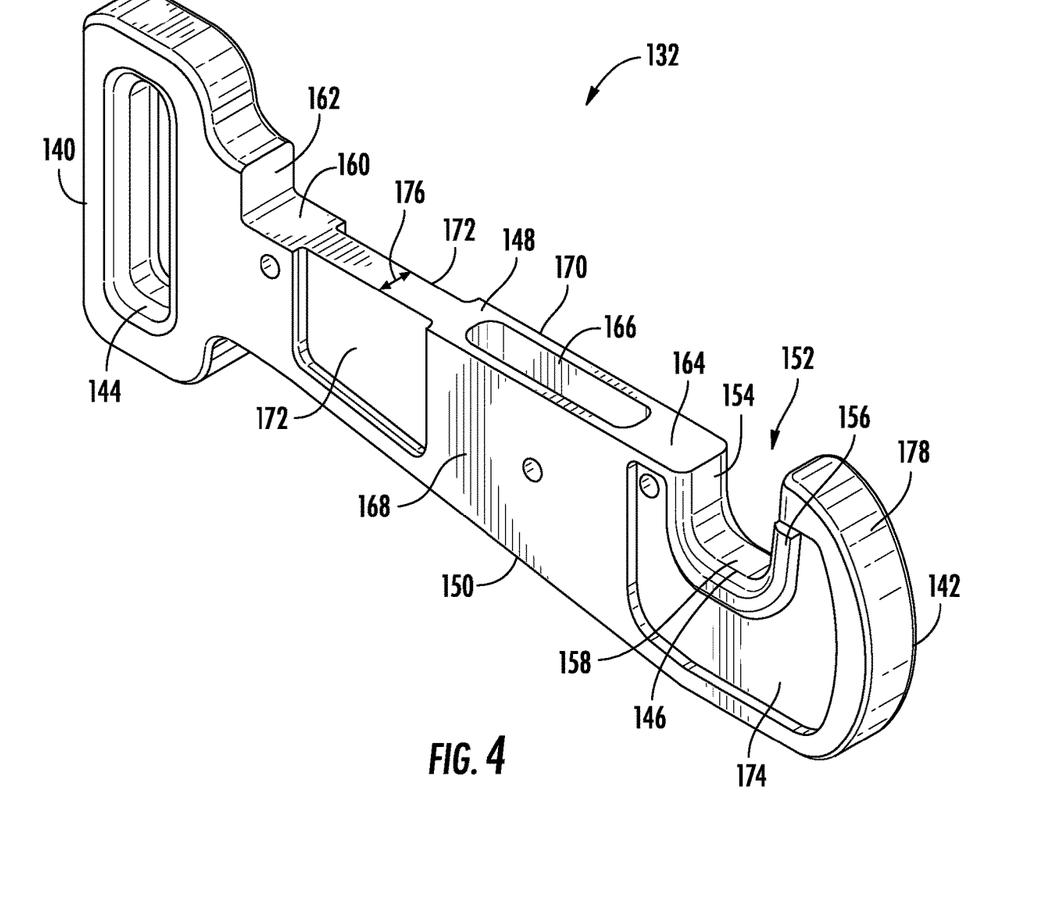
FIG. 4 is a perspective view of a main body of the quick release assembly shown in FIG. 3.

The connecting member receiving portion 144 comprises an opening extending through a thickness of the main body 132. According to various exemplary embodiments, the opening has a general slot or race track shape and is configured to receive a portion of the webbing 128 such that the webbing 128 wraps around the first end 140 of the main body 132 as shown in FIG. 2.

The ring receiving portion 146 comprises a general groove or notch shaped opening with an open end 152 opposite the lateral side 150 of the main body 132. The opening further comprises a first side surface 154, a second side surface 156, and a third side surface 158 between the first and second side surfaces. The first side surface 154 extends from an edge of the contact surface 148. The second side surface 156 is opposite the first side surface 154. The third side surface 158 is opposite the open end 152. According to various exemplary embodiments, the first side surface 154 is substantially perpendicular to the contact surface 148 and the second side surface 156 is angled in a direction away from first side surface 154. However, in alternate embodiments, any suitable side surface configuration may be provided.

The contact surface 148 extends between the first end 140 and the second end 142 of the main body 132 such that a first end 160 of the contact surface 148 is at a bearing surface 162 of the main body 132 and an opposite second end 164 of the contact surface 148 is at the first side surface 154 of the opening 146.

The main body 132 further comprises a lever opening 166 between the first end 140 and the second end 142 of the main body 132. The lever opening 166 comprises an elongated opening extending from the lateral side 150 of the main body 132 to the contact surface 148. The lever opening 166 is sized and shaped to allow the lever 138 to pivot and extend therethrough.

The main body 132 comprises a substantially uniform thickness between surfaces 168 and 170. However, according to some embodiments, areas of reduced thickness may be provided at relief cut surfaces 172, 174. A reduced thickness portion 176 between surfaces 172 of the main body can be seen to intersect the contact surface 148 (see FIG. 4). Additionally, groove sections 178 may be provided between uniform thickness areas proximate the second end 142 of the main body 132. Similar to the reduced thickness portion 176, the groove sections 178 provide another reduced thickness portion between surfaces 174 which intersect the third side surface 156 of the opening 146.

Figure 9:
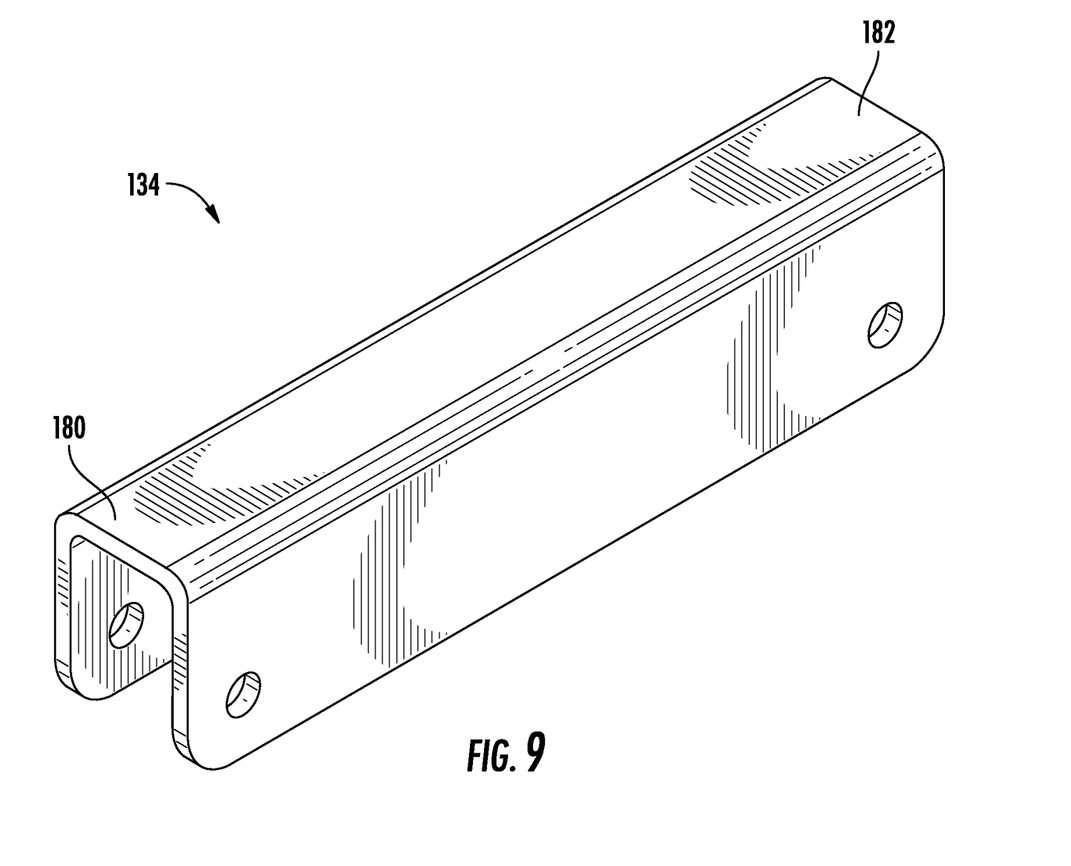
FIG. 9 is a perspective view of a cover portion of the quick release assembly shown in FIG. 3.

Referring now also to FIG. 9, the cover member 134 comprises a one-piece member having a general U-shaped cross-section configuration and extends between the first end 140 and the second end 142 of the main body 132 such that a first end 180 of the cover member is proximate the bearing surface of the main body 132 and an opposite second end 182 of the cover member is proximate the first side surface 154 of the opening 146. According to various exemplary embodiments, the cover member 134 is attached to the main body 132 by fasteners 184. The fasteners may be roll pins for example, however in alternate embodiments any suitable fasteners may be provided. The configuration of the U-shaped cover member 134 and the contact surface 148 of the main body 132 form a rectangular channel 186 wherein three sides of the rectangular channel 186 are provided by the interior surface of the cover member 134 and the fourth side of the rectangular channel 186 is provided by the contact surface 148 of the main body 132.

Figure 10:
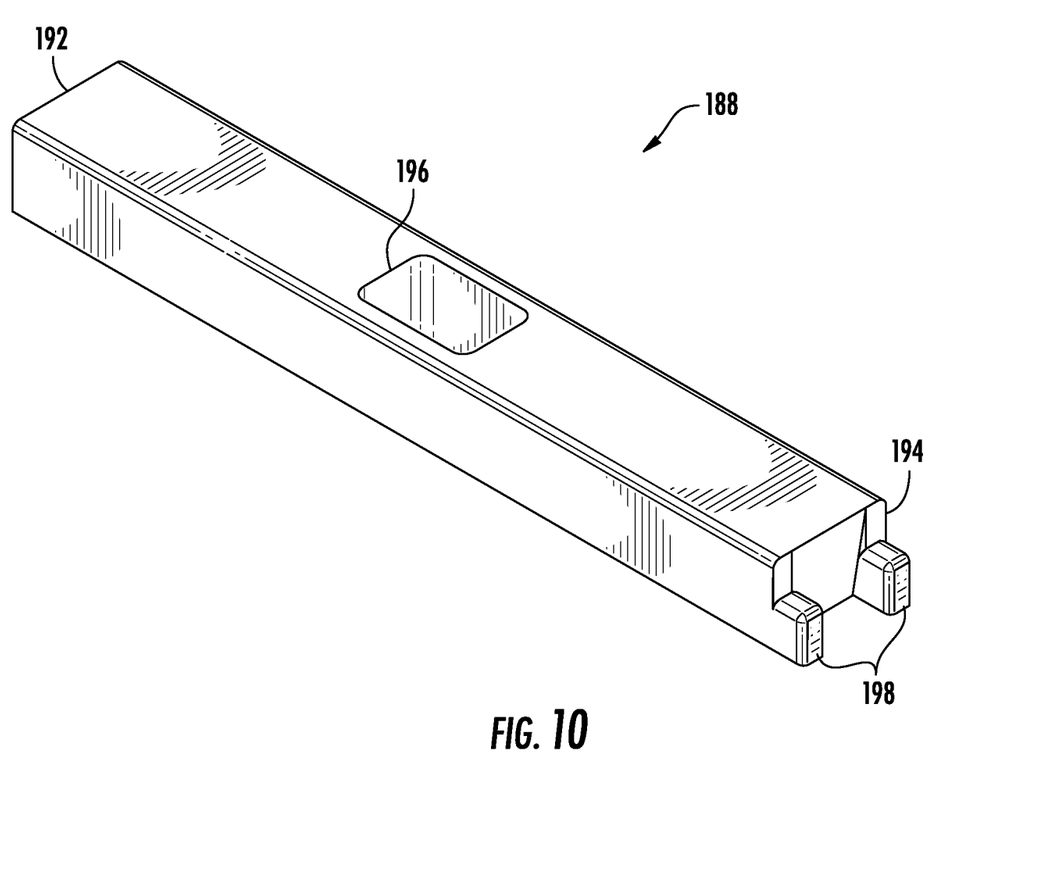
FIG. 10 is a perspective view of the pin of the quick release assembly shown in FIG. 3.

The pin assembly 136 comprises a pin 188 and a resilient member 190. The pin 188 and the resilient member 190 are received within the rectangular channel 186 such that the resilient member 190 is between the bearing surface 162 of the main body 132 and the pin 188 to allow for a movable (or slidable) pin configuration within the rectangular channel 186. In the embodiment shown in FIGS. 7 and 8, the resilient member 190 is a compression spring, however in alternate embodiments any suitable type of resilient member may be provided. The pin 188 comprises a general rectangular cross-section extending form a first end 192 of the pin to a second end of the pin 194 (see FIG. 10). The first end 192 of the pin is configured to contact the resilient member 190. The second end 194 of the pin is configured to extend between the first and second side surfaces 154, 156 of the opening 146 based on the movable pin position (see FIGS. 7-8). The pin 188 further comprises a slot 196 between the first end 192 and the second end 194. The slot 196 is sized and shaped to receive an end of the lever 138. According to various exemplary embodiments, the second end 194 of the pin comprises tabs 198 extending therefrom. The tabs 198 are configured to be received by the grooves 178 of the main body 132.

Figure 7:
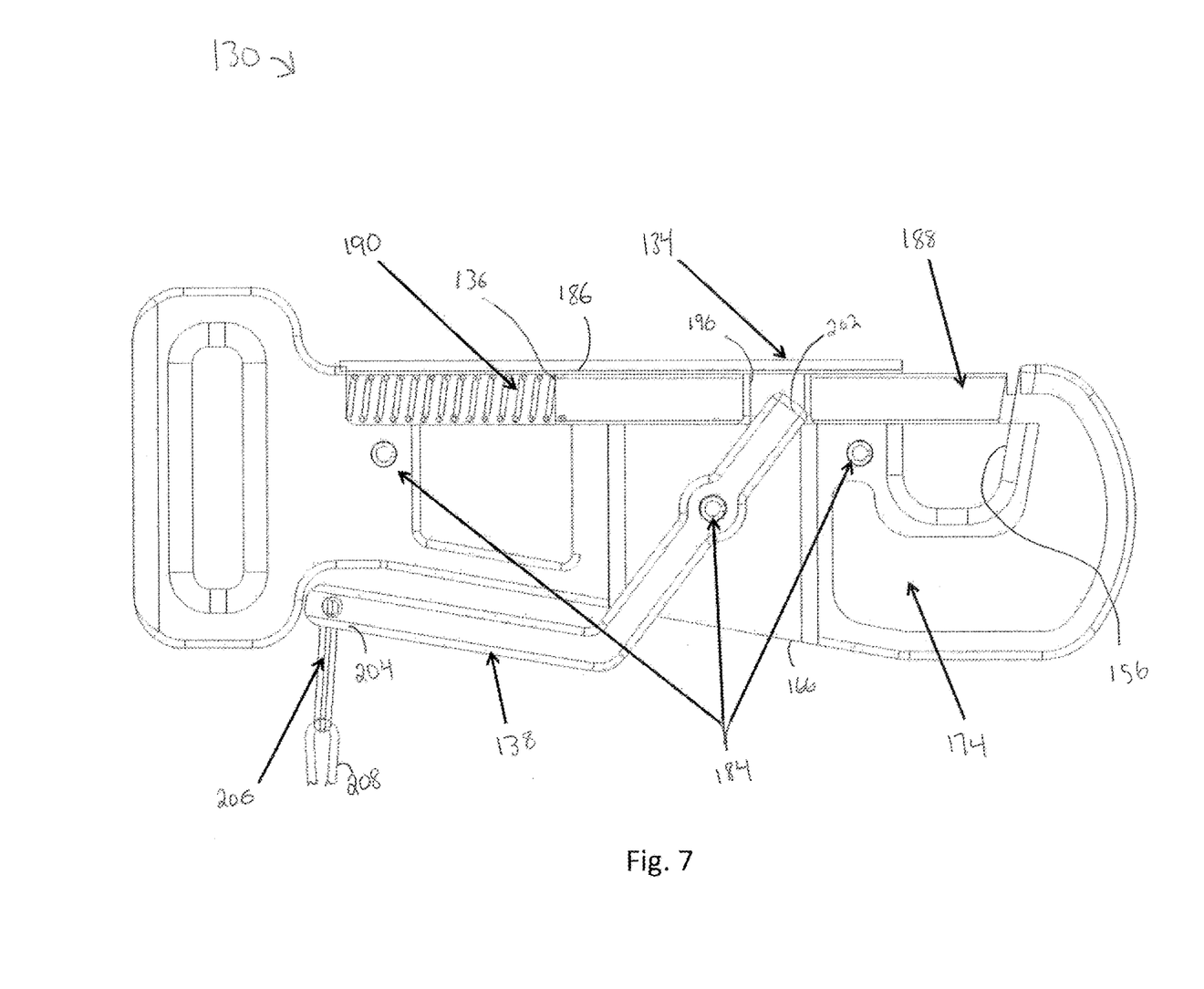
FIG. 7 is a cross section view of the quick release assembly shown in FIG. 3 with the pin in the closed position.
Figure 8:
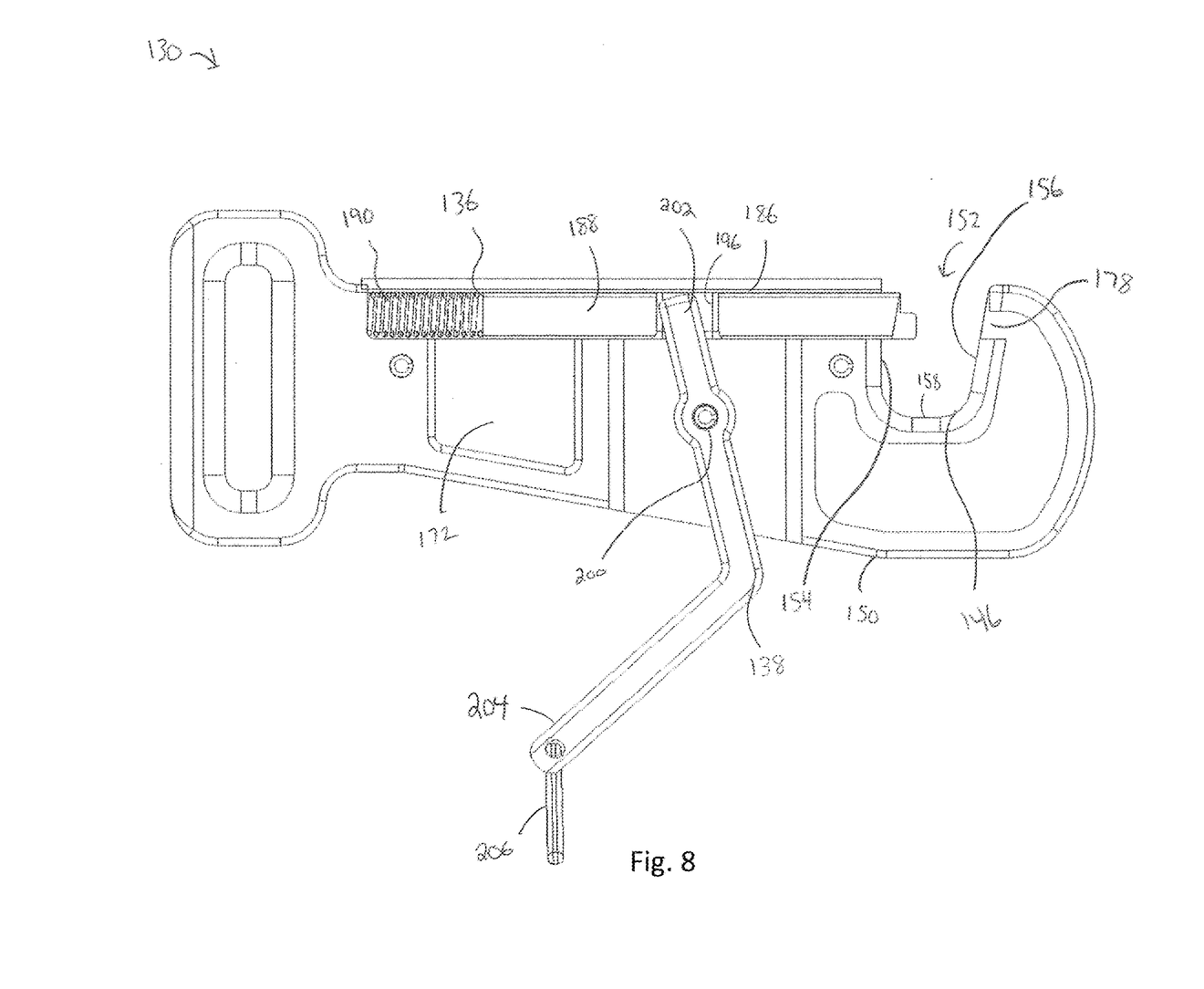
FIG. 8 is a cross section view of the quick release assembly shown in FIG. 3 with the pin in the open position (and pivoted lever)

The lever 138 is configured to be movably mounted within the lever opening 166 of the main body by fastener 184. The fastener is supported on both ends by openings in surfaces 168, 170 of the main body 132 with the lever pivotably mounted therebetween at opening 200 of the lever. A first end 202 of the lever 138 is configured to engage the pin 188 at the slot 196. A second end 204 of the lever 138 is configured to be operable by a user. According to various exemplary embodiments, a ring 206 and pull tab (or lanyard) 208 may be connected to the second end 204 of the lever 138 to assist a user to actuate the lever.

The quick release system 100 uses the ratchet 102 to tension the lashing 110 and the quick release assembly 130 to provide an easy de-tensioning and disconnect method. According to various exemplary embodiments, release of the quick release assembly 130 is actuated by the lanyard 208. Pulling the lanyard 208 (which causes the lever 138 to pivot) de-tensions the lashing and disconnects the quick release system in one movement as explained below.

Figure 5:
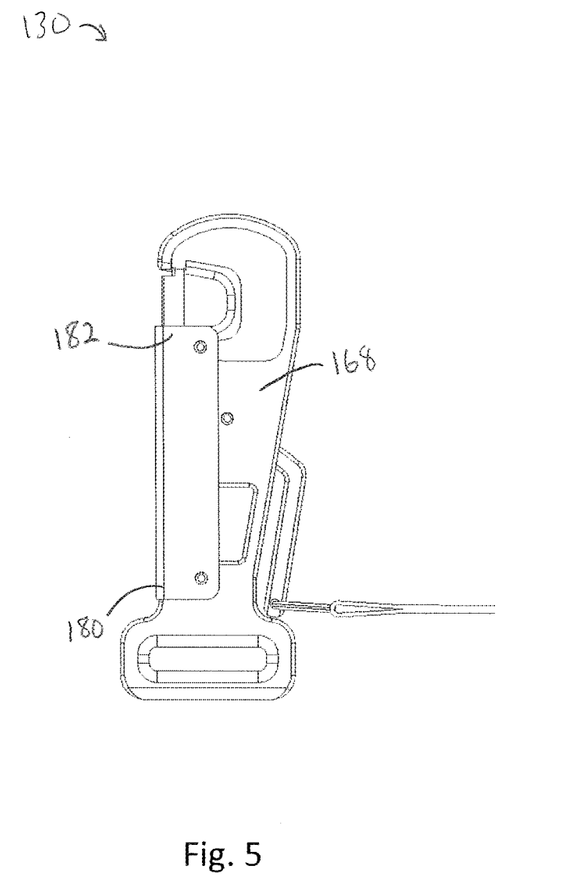
FIG. 5 is a top plan view of the quick release assembly shown in FIG. 3 with a pin in the closed position.

FIGS. 5 and 7 show the quick release assembly 130 in the closed position. In the closed position the resilient member 190 exerts a biasing force on the pin 188 towards the second side surface 156. The biasing force maintains the pin 188 in a fully extended position where the tabs 198 are received by the grooves 178 and the pin extends across the open end 152 to secure the D-shaped ring 114 within the opening 146. Interfacing of the tabs 198 with the grooves 178 allows the pin 188 to be supported at the second end 194 (in addition to being supported at the first end 192 by the rectangular channel 186).

Figure 6:
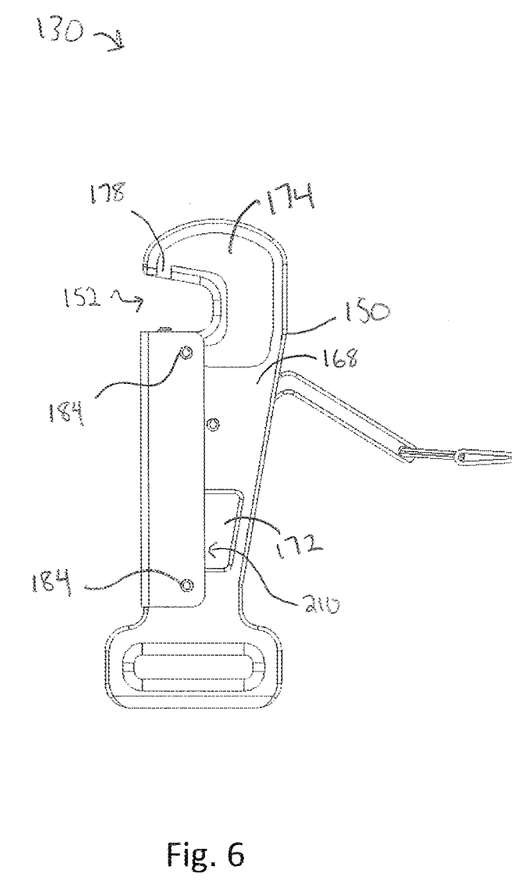
FIG. 6 is a top plan view of the quick release assembly shown in FIG. 3 with the pin in the open position (and pivoted lever)

When the lever 138 is actuated by the user (such as by pulling the lanyard 208), pivoting of the lever 138 provides a force between the first end 202 of the lever and the slot 196 of the pin 188 (in a direction away from the second side surface 156). Once the biasing force is overcome, the pin 188 is configured to move away from the second side surface 156 (and slide into the rectangular channel 186) to the open position (as shown in FIGS. 6 and 8). Movement of the pin 188 to the open position frees the D-shaped ring 114 and allows the strap 110 to be disconnected from the quick release assembly 130. Additionally, the angled side surface 156 allows for de-tensioning and guidance of the D-shaped ring 114 out of the opening 146. Further, pulling of the lever 138 to the open position also pulls the quick release assembly 130 away from the ring 114 to help prevent binding.

When the user releases the lanyard 208, the biasing force of resilient member 190 moves the pin 188 towards the second side surface 156 and returns the quick release assembly 130 to the closed position.

The configuration of the main body 132 and the cover member 134 aid in the reliability of the opening and closing of the quick release assembly 130 by providing drainage openings 210. The drainage openings 210 are formed between the relief cut surfaces 172 and the inner surface of the cover member 134, as the edges of the cover member 134 are spaced from edges of the main body 130 and overlap the relief cut surfaces 172. Additionally, since the relief cut surfaces 172 are aligned with the resilient member 190 and the pin 188 (best shown in FIGS. 7, 8), and with the intersection of the relief cut surfaces 172 with the contact surface 148 (forming the reduced thickness portion 176), any sand, dust or other debris that enters the rectangular channel can drain out of the drainage openings 210.

Figure 11:
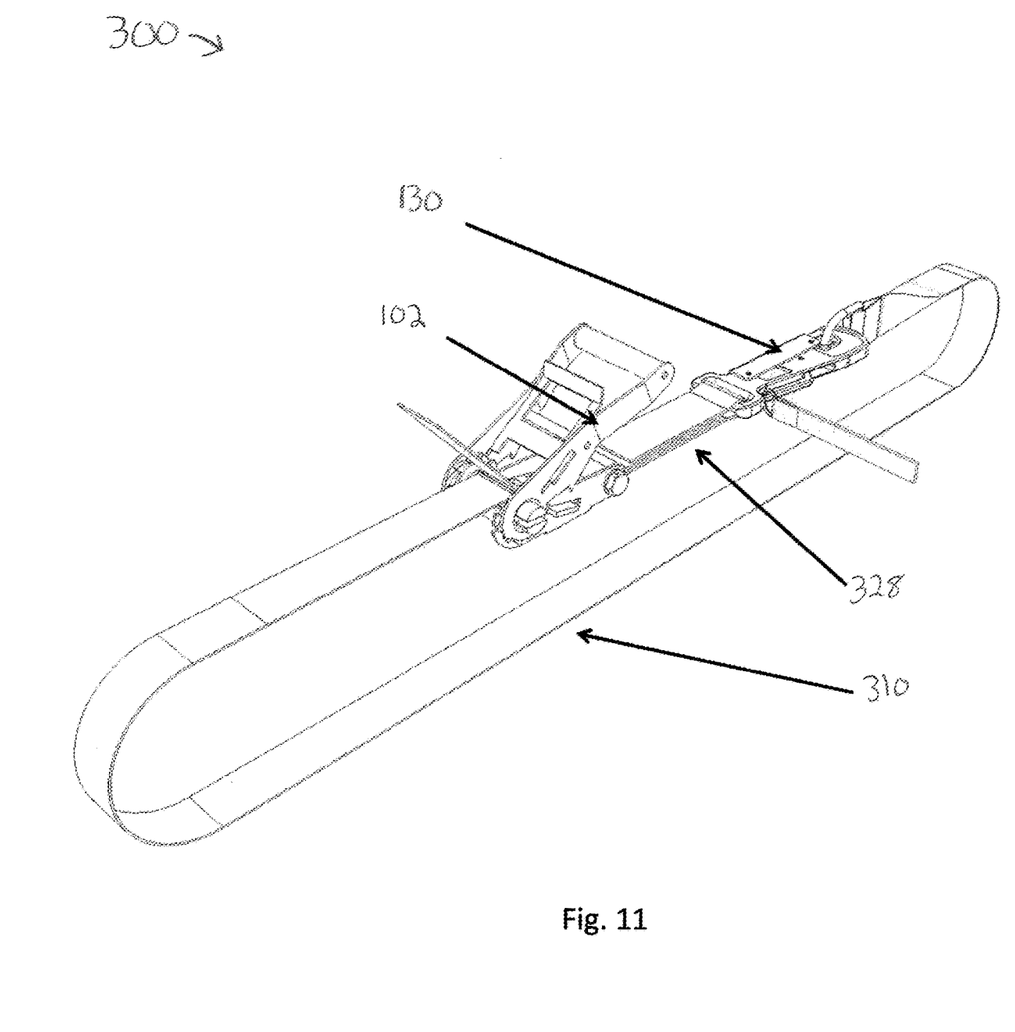
FIG. 11 is a perspective view of an alternate embodiment of a quick release system incorporating features of the present disclosure.

Referring now also to FIG. 11 another embodiment of the quick release system is shown. Similar to the quick release system 100, the quick release system 300 includes the strap adjusting member 102 and the quick release assembly 130. However in this embodiment, the connecting member 328 and the strap assembly 310 comprise textile tie down straps with a 10,000 lb. breaking strength classification (whereas the connecting member 128 and the strap assembly 110 comprise textile tie down straps with a 5,000 lb. breaking strength classification). It should also be noted that while various exemplary embodiments have been described above in connection with the connecting member 128, 328 comprising a tie down polyester webbing, one skilled in the art will appreciate that the various exemplary embodiments are not necessarily so limited and that alternate configurations for the connecting member may be provided. For example mechanical links configured to be connected between the strap adjusting member and the quick release assembly may be provided. Additionally, in some exemplary embodiments, the quick release assembly may have the connecting member receiving portion sized and shaped to receive the threaded fastener (which also extends through the mechanical links.

Technical effects of any one or more of the exemplary embodiments provide a quick release system used to connect payloads to aerial delivery platforms. The quick release system restrains the payload to the aerial delivery platform during flight, parachute extraction and landing. Each quick release system is disconnected from the payload by a simple release assembly. The quick release system replaces existing lashing systems which are difficult to remove.

Additional technical effects of any one or more of the exemplary embodiments allows the quick release system to use conventional military aerial rigging equipment (straps, tensioners), together with the Quick Release Assembly (QRA), to provide a universal replacement for the existing rigging method(s).

Further technical effects of any one or more of the exemplary embodiments allow the lever of the quick release assembly to have approximately a 3.5× mechanical advantage to reduce the opening effort. For example, as best seen in FIGS. 7 and 8, the lever 138 is configured to pivot about the fastener 184 at the opening 200 and the longer lever arm between the second end 204 of the lever 138 and the pivot point at the opening 200 (when compared to the lever arm between the first end 202 of the lever 138 and the pivot point) provides for a mechanical advantage when exerting a force on the pin 188. Additionally, the geometry and surface finish (which may be a Teflon coated finish, for example) of various exemplary embodiments ensure that with a 600 lb. pretension on the pin (or latch), the operating force is less than 12 lb.

Additional technical effects provide for system having about a 5,000 lb. capability (such as the quick release system 100) and for a system having about a 10,000 lb. capability (such as the quick release system 300).

Below are provided further descriptions of various non-limiting, exemplary embodiments. The below-described exemplary embodiments are may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

In one exemplary embodiment, a quick release assembly comprising: a main body having a first end, a second end, and an opening between the first end and the second end, wherein the first end comprises a first receiving portion, and wherein the second end comprises a second receiving portion; a cover member between the first end and the second end; a pin movably disposed between the main body and the cover member, wherein the pin comprises a slot; and a lever pivotably mounted at the opening of the main body, wherein a first end of the lever is at the slot of the pin, wherein a second end of the lever extends from a side of the main body; wherein the pin is configured to move between the first end and the second end of the main body in response to pivoting of the lever.

A quick release assembly as above, further comprising a resilient member between a bearing surface of the main body and the pin.

A quick release assembly as above, wherein an end of the pin comprises a tab, and wherein the second end of the main body comprises a groove configured to receive the tab.

A quick release assembly as above, wherein the main body comprises a contact surface, wherein the quick release assembly comprises a rectangular channel configured to receive the pin, wherein the contact surface forms one side of the rectangular channel, and wherein an interior surface of the cover member forms the remaining sides of the rectangular channel.

A quick release assembly as above, wherein the main body comprises a contact surface and a relief cut surface, wherein the pin is between the contact surface and the cover member, and wherein the relief cut surface is adjacent to the contact surface.

A quick release assembly as above, wherein the relief cut surface is adjacent to the pin.

A quick release assembly as above, further comprising a drainage opening between the cover member and the relief cut surface.

A quick release assembly as above, wherein the second receiving portion is configured to receive a ring, and wherein the pin is configured to secure the ring within the second receiving portion.

A quick release assembly as above, wherein the slot of the pin is adjacent the opening of the main body.

A quick release assembly as above, wherein the first receiving portion is configured to receive a connecting member.

In another exemplary embodiment, a quick release system comprising: a strap adjusting member; a strap assembly comprising a strap and a ring, wherein the strap is connected to the strap adjusting member; a quick release assembly removably connected to the strap, the quick release assembly having a main body, a cover member, a pin, and a lever, wherein the main body has a first end, a second end, and an opening between the first end and the second end, wherein the first end comprises a first receiving portion, and wherein the second end comprises a second receiving portion, wherein the cover member is between the first end and the second end, wherein the pin is movably disposed between the main body and the cover member, wherein the pin comprises a slot, wherein the lever is pivotably mounted at the opening of the main body, wherein a first end of the lever is at the slot of the pin, and wherein a second end of the lever extends from a side of the main body; and a connecting member between the quick release assembly and the ratchet tensioner; wherein the second receiving portion is configured to receive the ring, and wherein an end of the pin is configured to move within the second receiving portion of the main body in response to movement of the lever.

A quick release system as above, wherein an end of the pin comprises a tab, and wherein the second end of the main body comprises a groove configured to receive the tab.

A quick release system as above, wherein the main body comprises a contact surface, wherein the quick release assembly comprises a rectangular channel configured to receive the pin, wherein the contact surface forms one side of the rectangular channel, and wherein an interior surface of the cover member forms the remaining sides of the rectangular channel.

A quick release system as above, wherein the main body comprises a contact surface and a relief cut surface, wherein the pin is between the contact surface and the cover member, and wherein the relief cut surface is adjacent to the contact surface.

A quick release system as above, wherein the relief cut surface is adjacent to the pin.

A quick release system as above, further comprising a drainage opening between the cover member and the relief cut surface.

A quick release system as above, wherein the slot of the pin is adjacent the opening of the main body.

A quick release system as above, wherein the connecting member comprises a webbing.

A quick release system as above, wherein the connecting member comprises a textile webbing with a 10,000 lb. breaking strength classification.

A quick release system as above, wherein the strap adjusting member comprises a ratchet tensioner.

It should be understood that components of the invention can be operationally coupled or connected and that any number or combination of intervening elements can exist (including no intervening elements). The connections can be direct or indirect and additionally there can merely be a functional relationship between components.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

The invention claimed is:

1. A quick release assembly comprising:
a main body having a first end, a second end, and an opening between the first end and the second end, wherein the first end comprises a first receiving portion, and wherein the second end comprises a second receiving portion;
the second receiving portion comprises a groove or notch shaped opening having an open end, a first side surface, a second side surface located opposite the first side surface and a third side surface extending between the first and second side surfaces, said second side surface being angled in a direction away from the first side surface such that a distance between the first side surface and the second side surface is greater adjacent the open end than adjacent the third side surface;
a cover member between the first end and the second end;
a pin movably disposed between the main body and the cover member, wherein the pin comprises a slot; and
a lever pivotably mounted at the opening of the main body, wherein a first end of the lever is configured to engage with the slot of the pin, wherein a second end of the lever is oriented at an angle relative to the first end and extends from a side of the main body;
wherein the pin is configured to move between the first end and the second end of the main body in response to pivoting of the lever.

2. The quick release assembly of claim 1 further comprising a resilient member between a bearing surface of the main body and the pin.

3. The quick release assembly of claim 1 wherein an end of the pin comprises a tab, and wherein the second end of the main body comprises a groove configured to receive the tab.

4. The quick release assembly of claim 1 wherein the main body comprises a contact surface, wherein the quick release assembly comprises a rectangular channel configured to receive the pin, wherein the contact surface forms one side of the rectangular channel, and wherein an interior surface of the cover member forms the remaining sides of the rectangular channel.

5. The quick release assembly of claim 1 wherein the main body comprises a contact surface and a relief cut surface, wherein the pin is between the contact surface and the cover member, and wherein the relief cut surface is adjacent to the contact surface.

6. The quick release assembly of claim 5 wherein the relief cut surface is adjacent to the pin.

7. The quick release assembly of claim 5 further comprising a drainage opening between the cover member and the relief cut surface.

8. The quick release assembly of claim 1 wherein the second receiving portion is configured to receive a ring, and wherein the pin is configured to secure the ring within the second receiving portion.

9. The quick release assembly of claim 1 wherein the slot of the pin is adjacent the opening of the main body.

10. The quick release assembly of claim 1 wherein the first receiving portion is configured to receive a connecting member.

11. A quick release system comprising:
- a strap adjusting member;
- a strap assembly comprising a strap and a ring, wherein the strap is connected to the strap adjusting member;
- a quick release assembly in accordance with claim 1 removably connected to the strap; and
- a connecting member between the quick release assembly and the strap adjusting member;
- wherein the second receiving portion is configured to receive the ring, and wherein an end of the pin is configured to move within the second receiving portion of the main body in response to movement of the lever.

12. The quick release system of claim 11 wherein an end of the pin comprises a tab, and wherein the second end of the main body comprises a groove configured to receive the tab.

13. The quick release system of claim 11 wherein the main body comprises a contact surface, wherein the quick release assembly comprises a rectangular channel configured to receive the pin, wherein the contact surface forms one side of the rectangular channel, and wherein an interior surface of the cover member forms the remaining sides of the rectangular channel.

14. The quick release system of claim 11 wherein the main body comprises a contact surface and a relief cut surface, wherein the pin is between the contact surface and the cover member, and wherein the relief cut surface is adjacent to the contact surface.

15. The quick release system of claim 14 wherein the relief cut surface is adjacent to the pin.

16. The quick release system of claim 14 further comprising a drainage opening between the cover member and the relief cut surface.

17. The quick release system of claim 11 wherein the slot of the pin is adjacent the opening of the main body.

18. The quick release system of claim 11 wherein at least one of:
- the connecting member comprises a webbing; and
- the connecting member comprises a textile webbing with a 10,000 lb. breaking strength classification.

19. The quick release system of claim 11 wherein the strap adjusting member comprises a ratchet tensioner.

20. A quick release assembly comprising:
- a main body having a first end, a second end, and an opening between the first end and the second end, wherein the first end comprises a first receiving portion, and wherein the second end comprises a second receiving portion;
- the second receiving portion comprises a groove or notch shaped opening having an open end, a first side surface, a second side surface located opposite the first side surface and a third side surface extending between the first and second side surfaces, said second side surface being angled in a direction away from the first side surface such that a distance between the first side surface and the second side surface is greater adjacent the open end than adjacent the third side surface;
- a cover member between the first end and the second end;
- a pin movably disposed between the main body and the cover member, wherein the pin comprises a pin opening; and
- a lever pivotably mounted at the opening of the main body, wherein a first end of the lever extends into the opening of the main body and is configured to engage with the pin opening, wherein a second end of the lever is oriented at an angle relative to the first end and extends outside the main body,
- wherein the pin is configured to move between an open position and a closed position in response to pivoting of the lever between a first position and a second position,
- wherein the pin is biased toward the closed position closing off the open end of the groove or notch shaped opening, and
- wherein the second side surface is configured to allow for de-tensioning and guidance of a ring out of the groove or notch shaped opening when the pin is moved by the lever to the open position.

\* \* \* \* \*